United States Patent
Stoffelsma et al.

(10) Patent No.: US 6,684,910 B2
(45) Date of Patent: Feb. 3, 2004

(54) MULTI-LAYERED PIPE

(75) Inventors: Jan Uilke Stoffelsma, Hardenberg (NL); Volker Koestring, Twist (DE); Ali Guettouche, Haren/Ems (DE); Helmut Schroeder, Nordhorn (DE)

(73) Assignee: Wavin B.V., W Zwolle (NL)

( * ) Notice: Subject to any disclaimer, the term of this patent is extended or adjusted under 35 U.S.C. 154(b) by 0 days.

(21) Appl. No.: 10/296,600

(22) PCT Filed: May 8, 2001

(86) PCT No.: PCT/EP01/05174

§ 371 (c)(1),
(2), (4) Date: Jan. 6, 2003

(87) PCT Pub. No.: WO01/94112

PCT Pub. Date: Dec. 13, 2001

(65) Prior Publication Data

US 2003/0089413 A1 May 15, 2003

(30) Foreign Application Priority Data

Jun. 8, 2000 (DE) .......................... 200 10 111

(51) Int. Cl.$^7$ .............................. F16L 11/00; F16L 9/12
(52) U.S. Cl. ........................ 138/137; 138/140; 138/141; 138/142; 428/36.91
(58) Field of Search .................................. 138/137, 140, 138/141, 142; 428/36.91

(56) References Cited

U.S. PATENT DOCUMENTS

| | | | | | |
|---|---|---|---|---|---|
| 4,211,595 A | * | 7/1980 | Samour | ...................... | 156/187 |
| 4,892,442 A | * | 1/1990 | Schoffner | .................... | 405/154 |
| 5,472,754 A | * | 12/1995 | Douchet et al. | ......... | 428/36.91 |
| 6,287,657 B1 | * | 9/2001 | Gebizlioglu | ............. | 428/36.91 |
| 6,433,095 B1 | * | 8/2002 | Laurent | ...................... | 525/240 |
| 6,569,948 B2 | * | 5/2003 | Laurent | ...................... | 525/240 |
| 6,579,922 B2 | * | 6/2003 | Laurent | ...................... | 524/240 |
| 2002/0156214 A1 | * | 10/2002 | Laurent | ...................... | 526/240 |
| 2002/0161157 A1 | * | 10/2002 | Laurent | ...................... | 526/352 |

FOREIGN PATENT DOCUMENTS

| | | | | | |
|---|---|---|---|---|---|
| DE | 29706045 U1 | * | 6/1997 | | |
| DE | 29906998 U1 | * | 7/1999 | ........... | B29C/47/06 |
| EP | 0358178 A1 | * | 3/1990 | .......... | F16L/09/12 |
| EP | 1046849 A1 | * | 10/2000 | .......... | F16L/09/133 |
| NL | 1008960 C2 | * | 10/1999 | .......... | F16L/09/12 |

* cited by examiner

Primary Examiner—Patrick Brinson
(74) Attorney, Agent, or Firm—Jordan and Hamburg LLP

(57) ABSTRACT

A pipe of layers of thermoplastic polyolefins of the same type, however with different properties, which are connected inseparably with one another, an outer first layer and a second layer, adjoining the first layer on the inside, consisting of a material, which has not been cross-linked, the second layer approximately having the FNCT the value or the NPT value of a one-layer standard pressure pipe and the first layer having an FNCT or NPT value, which is higher by a factor of at least 3 than that of the second value. Moreover, a third layer is provided, which adjoins the second layer on the inside, also consists of material that is not cross-linked and has a PNCT, which is higher by a factor of at least 3 than that of the second layer and an NPT layer, which is higher by a factor of at least 2 than that of the second layer.

10 Claims, No Drawings

MULTI-LAYERED PIPE

BACKGROUND OF THE INVENTION

The invention relates to a pipe of coaxial layers of thermoplastic olefins, which jointly form the wall of the pipe.

For a known pipe of this type (DE 299 06 998.2 U1), the pipe consists of an outer and an inner layer, the inner layer of which has the FNCT (full notched creep test) or NPT (notched pipe test) value of a single-layer pressure pipe and the outer layer of which has an FNCT or NPT value, which is higher by a factor of at least 3.

SUMMARY OF THE INVENTION

Starting out from this, the invention is concerned with the problem of increasing the load-carrying capability of the pipe while it is being and after it has been laid.

All of the layers of the inventive pipe consist of a material, which has not been cross-linked, so that the ends of the pipes can be joined together reliably, without problems, with all normal connecting techniques, such as electric sleeve or butt welding. The pipe, moreover, can be recycled without problems, since interfering, cross-linked regions are not present. Moreover, the pipe is exceptionally durable, since the crack growth in the outer layer, notch-stressed during laying, especially when laying without a trench, is a very low. This is the case particularly also at the low temperatures, which are encountered by pipelines, laid end-to-end for water, gas, etc. In particular, however, the pipe also withstands high point loads, such as those, caused, for example, by stones, since the innermost third layer, because of its increased FNCT or NPT value, can absorb, without a damage, the significantly higher tensile stresses in the inner layer, which occur during point loads.

The first and third layers may have an FNCT value, which is higher by a factor of at least 5, and an NPT value, which is greater by a factor of 2.5 than the corresponding values of the second layer, if this is desirable for overcoming special loads.

All layers of the pipe are combined by melting or welding into a pipe unit, which behaves like a single-layer pipe, the pipe with its three layers having a standard external diameter and a standard ratio of external diameter to total wall thickness (SDR) which is generally 11 or 17.

Advantageously, the sum of the wall thicknesses of the first and third layers amounts to 50 percent of the total wall thickness of the pipe, advisably, the wall thickness of the third layer being at least 20 percent of the total wall thickness of the pipe. In a preferred embodiment, the wall thicknesses of the first and third layers amount to 25 percent each and the wall thickness of the second layer is 50 percent of the total thickness of the pipe.

All layers of the pipe consist preferably of high-density polyethylene (HDPE). The layers of the pipe may consist uniformly of PE 80 or PE 100. Instead, one is free to select PE 100 or PE 80 for any of the layers.

Advantageously, the first and third layers consist of an HDPE, copolymerized with hexene and with a bimodal distribution of molecular weights. An additive, increasing the UV resistance or providing color, may be admixed at least with the first layer of the pipe.

The first and third layers have an FNCT (full notched creep test) value, which is higher by a factor at least of 3 or an NPT (notched pipe test) value, which is higher by a factor of at least 2 than the corresponding value of the second layer, which has the FNCT or NPT value of a single-layer, standard pressure pipe. The article by S. H. Beech, S. J. Palmer and R. W. Burbridge, under the title of "ACCELERATED LABORATORY TESTS TO PREDICT THE RESISTANCE TO SLOW CRACK GROWTH OF HIGH PERFORMANCE POLYETHYLENE PIPE RESINS" in the 1997 International Plastic Pipe Symposium (1997), pages 205 ff., is referred to with regard to carrying at the test for determining the FNCT values.

Furthermore, the article by M. Fleissner under the title of "Experience With a Full Notch Creep Test in Determining the Stress Crack Performance of Polyethylene" in, POLYMER ENGINEERING AND SCIENCE, February 1998, volume 38, number 2, is referred to.

On the basis of the test conditions described, at 80° C., 4.6 Mpa and 2 percent Arkopal N100 as soap, the FNCT value of a one-layer standard pressure pipe of PE 100 is about 200–500 h and the FNCT value of the inventive material of the first and third layers is about 600 to 1500 h. When HDPE, which is copolymerized with hexene and has a bimodal molecular weight distribution, is used, the FNCT value exceeds 2200 h and may reach a magnitude of about 3000 h.

With regard to carrying out the test for determining the NPT value, reference is made to the report by W. J. Allwood and S. H. Beeh "THE NOTCHED PIPE TESTS FOR THE PERFORMANCE ASSESSMENT OF POLYETHYLENE PIPE", Plastic Fuel Gas Pipe Symposium, (1993), pp. 339 ff. On the basis of the test conditions described there, at 80° C. and 4.6 Mpa, the NPT value of a single-layer standard pressure pipe of PE 100 is about 3000 h, and the NPT value of the inventive material of the first and third layers is at least about 6000 h. If HDPE, which has been copolymerized with hexene and has a bimodal molecular weight distribution, is used, the NPT value may also have a considerably greater magnitude of up to 7500 h.

What is claimed is:

1. A pipe of layers of thermoplastic polyolefins of a similar type, however, with different properties, which are joined inseparably to one another, an outer first layer and a second layer, adjoining the inside of the first layer, consisting of a material, which is not cross-linked, the second layer having approximately the FNCT value or the NPT value of a single-layer standard pressure pipe and the first layer having an FNCT value, which is higher by a factor of at least 3 than that of the second layer and an NPT value, which is higher than that of the second layer, wherein a third layer, adjoining the inside of the second layer, is provided and also consists of a material, which has not been cross-linked, and has an FNCT value, which is higher by at least a factor of 3 and an NPT value, which is higher by a factor of at least 2 than the corresponding values of the second layer.

2. The pipe of claim 1, wherein the first and the third layers have an FNCT value, which is higher by a factor of at least 5, and an NPT value, which is higher by a factor of at least to 2.5, than that of the corresponding values of the second layer.

3. The pipe of claims 1 or 2, wherein all layers of the pipe are joined together by melting or welding to form a pipe unit, which behaves like a single-layer pipe.

4. The pipe of claims 1 or 2, wherein the total wall thickness of the first and the third layers amounts up to 50 percent of the total wall thickness of the pipe.

5. The pipe of claim 4, wherein the wall thickness of the third layer amounts to at least 20 percent of the total wall thickness of the pipe.

6. The pipe of claims 1 or 2, wherein all of the layers of the pipe consists of polyethylene of high density (HDPE).

7. The pipe of claims 1 or 2, wherein all the layers of the pipe consists of PE 80 and/or PE 100.

8. The pipe of claims 1 or 2, wherein the material of the first and the third layers of the pipe consists of HDPE, which has been copolymerized with hexene and has a bimodal molecular weight distribution.

9. The pipe of claims 1 or 2, wherein a material, which increases the UV resistance, has been mixed with the material of outer layer of the pipe.

10. The pipe of claims 1 or 2, wherein a coloring additive has been mixed with the material of the outer layer of the pipe.

\* \* \* \* \*

UNITED STATES PATENT AND TRADEMARK OFFICE
CERTIFICATE OF CORRECTION

PATENT NO.    : 6,684,910 B2
DATED         : February 3, 2004
INVENTOR(S)   : Jan Uilke Stoffelsma et al.

It is certified that error appears in the above-identified patent and that said Letters Patent is hereby corrected as shown below:

<u>Title page,</u>
Item [73], Assignee, correct from "Wavin B.V., W Zwolle (NL)" to
-- Wavin B.V., CW Zwolle (NL) --

Signed and Sealed this

Sixth Day of April, 2004

JON W. DUDAS
*Acting Director of the United States Patent and Trademark Office*